United States Patent [19]

Gordy et al.

[11] 4,131,379
[45] Dec. 26, 1978

[54] SELF-RETAINING CONDUIT ANCHORING DEVICE

[75] Inventors: Donald G. Gordy; David P. Klosterman, both of Moberly, Mo.

[73] Assignee: Orscheln Lever Sales Co., Moberly, Mo.

[21] Appl. No.: 872,912

[22] Filed: Jan. 27, 1978

[51] Int. Cl.² ............................................. F16B 9/00
[52] U.S. Cl. .................................. 403/197; 285/162; 16/2; 74/501 R; 403/238
[58] Field of Search ............... 403/197, 238, 239, 288; 16/2, 108; 74/501 R; 174/65 R, 65 G; 285/162

[56] References Cited

U.S. PATENT DOCUMENTS

| 2,869,905 | 1/1959 | Bratz | 403/290 |
| 2,954,248 | 9/1960 | Brickman | 285/162 X |
| 3,139,768 | 7/1964 | Biesecker | 74/501 |
| 3,221,572 | 12/1965 | Swick | 285/162 X |
| 3,366,405 | 1/1968 | Sevrence | 285/162 X |
| 3,415,549 | 12/1968 | Chatham | 285/162 X |
| 3,528,313 | 9/1970 | Beruo | 74/501 |

*Primary Examiner*—Andrew V. Kundrat
*Attorney, Agent, or Firm*—Lawrence E. Laubscher

[57] ABSTRACT

A three-piece self-retaining conduit anchoring device is disclosed for connecting a co-axial cable assembly with a support structure, including an inner sleeve member, an outer sleeve member concentrically arranged about the inner sleeve member, and a collar member concentrically arranged about the outer sleeve member. One end of the collar member abuts one side of the support, the other end of the collar member being supported against axial displacement by flange portions at the corresponding ends of the inner and outer sleeve members. The outer sleeve member includes a plurality of circumferentially arranged external resilient prongs that engage the other side of the support, which outer sleeve member is connected against axial displacement relative to the inner sleeve and collar members. Consequently, the collar flange and the outer sleeve prongs grip opposite surfaces of the support structure to rigidly connect the anchoring device thereto. Internal and external seal members may be provided for preventing the introduction of moisture and foreign matter into the cable assembly.

13 Claims, 10 Drawing Figures

SELF-RETAINING CONDUIT ANCHORING DEVICE

STATEMENT OF THE INVENTION

The present invention relates generally to a cable anchoring assembly, and more particularly to a self-retaining anchoring device for mounting the conduit member of a co-axial control cable assembly, such as, for example, an automotive brake cable assembly, within a support member (which may be a housing wall, bracket, or other similar anchor structure).

BRIEF DESCRIPTION OF THE PRIOR ART

While prior art conduit anchoring devices are well known in the art, such devices exhibit various operational or assembly characteristics which render the same commercially undesirable. For example, one type of well-known prior art device is exemplified by the assembly disclosed in the Bratz U.S. Pat. No. 2,869,905. It is noted in connection with such a device that the fitting is fabricated from a single blank of metal stock. In order to provide the fitting with a sufficient conduit compression load resistance, the struck-out portions or tabs must be relatively thick, and consequently, the metal stock material from which the tabs are formed must have a relatively large thickness dimension. However, as the resilient prongs of the fitting are also fabricated from the same metal stock material, their thickness is correspondingly large, and consequently, the flexibility of such prong members is limited. In assembling the fitting within a particular support member, it will therefore be difficult to depress the prong members without utilizing special installation tools. As a result, installation has proven to be relatively difficult to perform, and quite time-consuming to accomplish.

In order to overcome the disadvantages of the Bratz device, a multi-component conduit anchorage device or fitting may be employed. In this manner the required thickness of the tab members does not necessarily dictate the thickness of the prong members. An example of such a device is disclosed in the Sevrence U.S. Pat. No. 3,366,405. The depressible prongs of this device are integrally fabricated from a relatively thin tubular spring clip or anchor member, however, the remaining structure of the clip or anchor member and the corresponding interrelated structure of the main body member of the fitting with which the clip or anchor member operatively cooperates is relatively complex which renders such fittings expensive to manufacture. Consequently, such devices are not economically practical.

Still other prior art cable anchoring assemblies are exemplified by those assemblies disclosed in the patents to Chatham U.S. Pat. No. 3,415,549 and Swick U.S. Pat. No. 3,221,572. While these assemblies are also of the multi-component type, such assemblies, similar to those of Sevrence and Bratz, are likewise relatively expensive to manufacture, and the installation operation is relatively difficult to perform and quite time-consuming to accomplish. This is due to the fact that in assembling the fittings of Chatham and Swick, various auxiliary operations must be performed upon the various components of the fittings, such as, for example, swaging, beading, welding, or the like.

SUMMARY OF THE INVENTION

Accordingly, the present invention was developed to provide a new and improved cable anchoring assembly which overcomes the above and other disadvantages of prior art conduit anchoring devices.

More particularly, the present invention relates to an improved cable anchoring assembly which is self-retaining and which is quickly and easily mounted within an opening contained in a support member without the use of special installation tools.

A primary object of the present invention is to provide an improved coaxial cable anchoring assembly including an inner sleeve member having at one end internal stop means against which one end of the cable outer conduit member abuts, said stop means containing an opening through which the cable inner member extends, and outer sleeve and collar members arranged concentrically about the inner sleeve member, one end of the collar member abutting one surface of a support member, and the other end of the collar being retained against axial displacement by a flange on the inner sleeve member. The outer sleeve member, which is retained against axial displacement relative to the inner sleeve and collar members, includes a plurality of circumferentially arranged outwardly projecting resilient prongs that engage the other surface of the support.

Still yet another object of the present invention is to provide an improved cable anchoring assembly which is a multi-component assembly of relatively simplified inexpensive structural elements, said assembly being capable of supporting a relatively high conduit compressive load. The anchoring device may include seal means for preventing the introduction of foreign matter into the assembly.

Various embodiments of the present invention are disclosed wherein the length of the inner sleeve member may be appropriately selected in accordance, for example, with the size of the working area within which the assembly is to be accommodated, and in addition, various internal and external seal members may be employed in conjunction with the assembly components in order to prevent moisture and foreign matter from being introduced into the interior of the assembly.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1:
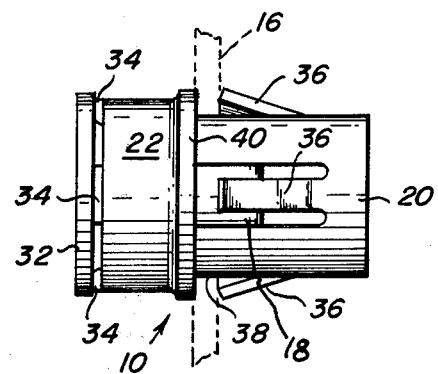
FIG. 1 is a side elevation view of a first embodiment of a conduit anchoring device constructed in accordance with the present invention.
Figure 2:
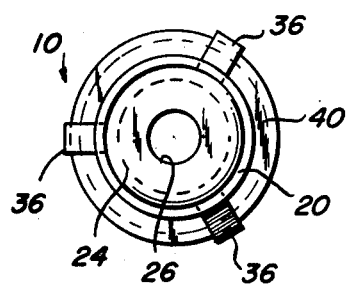
FIGS. 2 and 3 are right and left hand end views, respectively, of the conduit anchoring device of FIG. 1.
Figure 3:
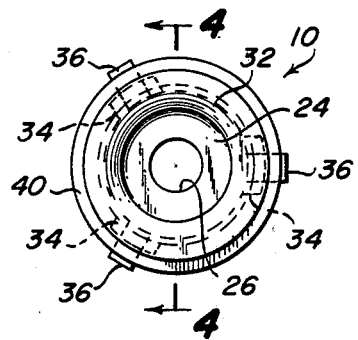

Referring now more particularly to FIGS. 1–5, the anchoring assembly 10 is adapted to secure the outer, tubular conduit member 12 of a co-axial control cable 14 within a through bore 38 contained in a support member 16. The control cable 14 may be, for example, an automotive brake cable, and the support member 16 may be, for example, a dashboard housing wall, bracket, or similar anchor structure on the vehicle.

Figure 4:
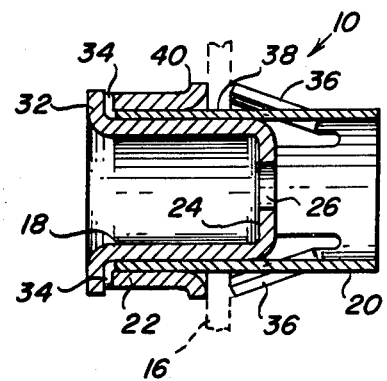
FIG. 4 is a sectional view taken along line 4—4 of FIG. 3.
Figure 5:
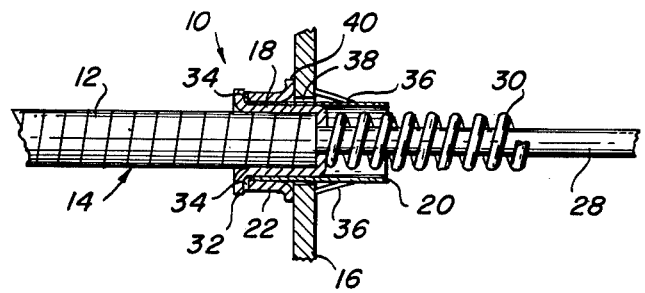
FIG. 5 is a sectional view of a cable assembly mounted within an opening contained in a support member by the anchoring assembly of FIGS. 1–4.

As best shown in FIGS. 4 and 5, the anchoring assembly 10 includes an inner sleeve member 18, an outer sleeve member 20 concentrically arranged about the inner sleeve member 18, and an annular collar member 22 which, in turn, is concentrically arranged about the outer sleeve member 20. The inner sleeve member 18 is tubular in construction for receiving one end of the conduit 12 of cable 14. In order to securely retain the conduit 12 within the assembly, the right end of inner sleeve member 18 is provided with a transverse wall 24 which defines stop means against which the right end of conduit 12 abuts, said transverse wall containing an axial through-bore 26 for receiving the inner member 28 of cable 14. A coil spring 30, which is similar to spring 44 of the Sevrence U.S. Pat. No. 3,366,405, is disposed about strand member 28 of cable 14 in a conventional manner.

The inner sleeve member 18 is fabricated from relatively thin, resilient stock material and includes at its left hand end an integral external flange portion 32 that defines first abutment means. The left hand end of the outer sleeve member includes a plurality of circumferentially spaced external tabs 34 that define second abutment means which are engaged by the left hand end of the collar member 22. At its right hand end, the collar member includes an annular external flange portion 40 that is adapted to engage one face of the support member 16. The right hand end of the outer sleeve member 20 is provided with a plurality of integral circumferentially-spaced radially outwardly biased prong portions 36 that extend toward and are spaced from the adjacent flange portion 40 of the collar member by a distance corresponding to the width of the support member 16.

OPERATION

In operation, the cable assembly is introduced from left to right into the anchoring assembly of FIG. 4 until the end of the outer cable member engages the transverse wall 24, the inner cable member 28 extending through the opening 26 contained in the transverse wall as shown in FIG. 5. The anchoring assembly is then progressively introduced from left to right in FIG. 5 to cause the resilient prongs 36 to be compressed by the walls of the support opening. When the collar flange portion 40 engages the adjacent face of support member 16, the prongs 36 spring radially apart so that the free extremities thereof engage the opposite face of the support member, whereby the cable assembly is positively maintained against axial displacement relative to the support member 16.

As shown in FIG. 4, the length of the inner sleeve member 18 is less than that of the outer sleeve member 20, thereby to define within the end of the outer sleeve member 20 a space for receiving the adjacent end of a spring 30 arranged concentrically about the inner cable member as shown in FIG. 5.

Figure 6:
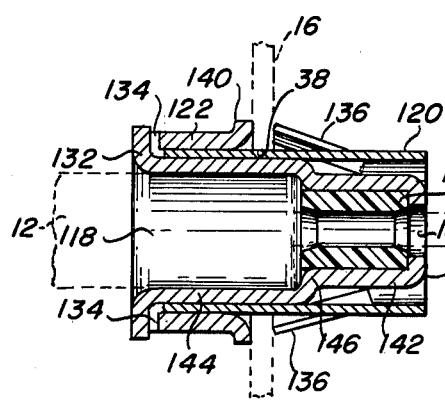
FIGS. 6–10 illustrate modifications of the cable anchoring assembly of FIG. 4.

Referring now to the modification of FIG. 6, the right hand end of the inner sleeve member 118 includes an end portion of reduced internal diameter 142 that defines a shoulder 146 which defines a stop that is engaged by the end extremity of the outer cable member 12. At its right hand end, the reduced inner sleeve portion 142 contains a transverse wall 150 that contains a through bore 152 that receives the inner cable member 28. A resilient annular seal member 148 (formed of rubber, an elastomer, or other suitable synthetic plastic material) is arranged within the inner sleeve reduced portion 142 concentrically about the inner cable member 28, one end of the seal being engaged by the extremity of the outer cable member 12 and the other end being in engagement with the transverse wall 150. As shown in FIG. 6, the length of the inner sleeve member 118 corresponds generally with that of the outer sleeve member 120.

Figure 7:
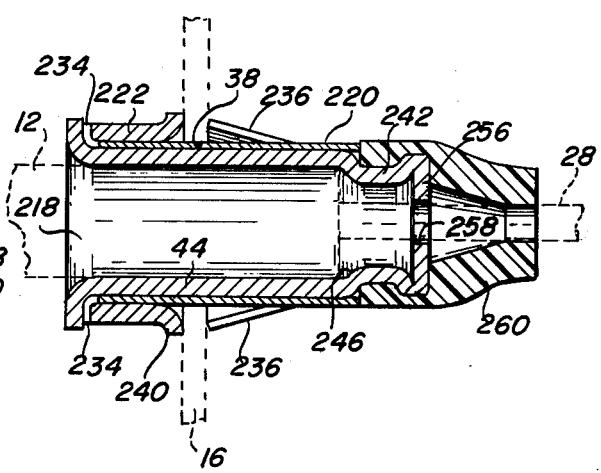

In the embodiment of FIG. 7, the length of the inner sleeve member 218 exceeds that of the outer sleeve member 220, the reduced portion 242 being contained in an intermediate portion of the inner sleeve member that extends beyond the outer sleeve member. The inner sleeve member terminates in a transverse wall 256 that contains a through bore 258 which receives the inner cable member 28 when the end extremity of the outer cable member 12 abuts the stop means defined by shoulder 246 of the reduced portion 242. In this embodiment, a resilient annular seal member 260 is mounted at one end concentrically about the exposed end of the inner sleeve member 218, the right hand end of the seal member 260 being reduced and having a central bore the internal diameter of which corresponds generally with that of the inner cable member 28.

Figure 8:
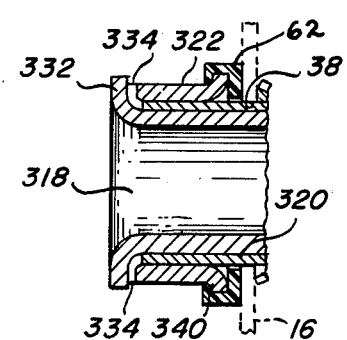

In the modification of FIG. 8, an annular resilient seal 62 is mounted concentrically about the right hand external flange portion 340 of the collar member 322, said seal being compressed between the adjacent surfaces of the collar member and the support member 16.

Figure 9:
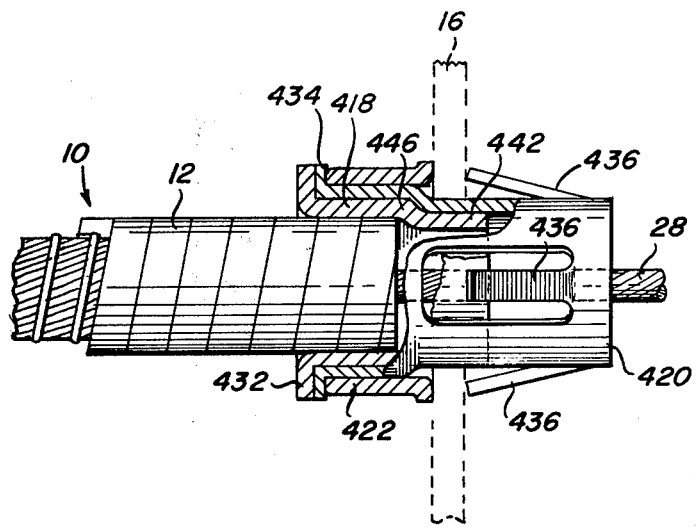

Referring now to the embodiment of FIG. 9 which is adapted for use with a cable 10 having an outer member 12 of relatively large external diameter, the right hand end portion of the outer sleeve member 420 is reduced to correspond with the reduced right hand end portion 442 of the inner sleeve member 418. The anchoring assembly is thereby strengthened against right hand pull applied to the cable assembly 10.

Figure 10:
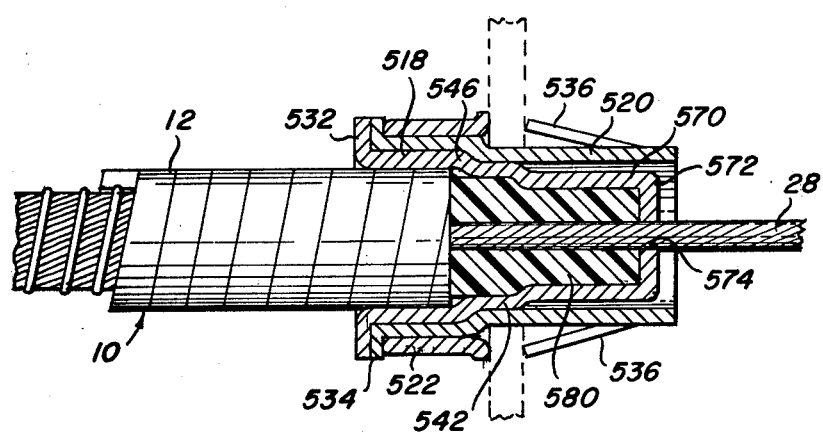

In the modification of FIG. 10, the right hand end of the inner sleeve member 518 is stepped to define an end portion 570 of further reduced internal diameter, which further reduced end portion terminates in a transverse wall 572. The transverse wall contains a through bore 574 which receives the inner cable member 28 when the outer cable member abuts the stop shoulder means 546 defined on the first inner sleeve reduced portion 542. An annular resilient seal member 580 is mounted concentrically within the stepped reduced portions 542 and 570 of the inner sleeve member, said seal member being compressed longitudinally between the extremity of the outer cable member 12 and the transverse wall 572.

In all of the embodiments of the invention, owing to the cooperation the collar means and the prong means with opposite faces of the support member, respectively, axial displacement of the anchoring assembly relative to the support member 16 is positively avoided. The provision of the seal means in various embodiments of the invention prevent the introduction of moisture and foreign matter into the interior of the cable assembly.

While in accordance with the Patent Statutes, the preferred forms and embodiments of the invention have been illustrated and described, it will be apparent to those skilled in the art that other changes and modifications may be made without deviating from the inventive concepts set forth above.

What is claimed is:

1. A self-retaining anchoring assembly for mounting a coaxial cable within a through bore defined in a support member, said coaxial cable including concentrically arranged inner and outer members, comprising (a) an inner sleeve member having at one end radially outwardly extending first abutment means, said inner sleeve member including adjacent its other end internal stop means arranged for engagement by the extremity of the outer cable member when said cable member is introduced axially into said inner sleeve member from said one end thereof with the inner cable member projecting from the other end thereof;

(b) an outer sleeve member mounted concentrically about said inner sleeve member, said outer sleeve member being in abutting engagement at one end with said inner sleeve first abutment means, said outer sleeve member including adjacent said one end radially outwardly extending second abutment means; and (c) an annular collar member arranged concentrically about said outer sleeve member and in abutting engagement at one end with said outer sleeve second abutment means;

(d) said outer sleeve member including adjacent its other end a plurality of integral, circumferentially spaced external resiliently outwardly biased prong portions that extend at one end in the direction of the said outer sleeve member one end, the extremities of said prongs being spaced from the other end of said collar member a distance equal to the thickness of said support member, whereby when the end of the anchoring assembly adjacent the said other end of said outer sleeve member is progressively introduced within the support bore to a position in which the other end of said collar member is in engagement with one face of the support member, the extremities of the prong members, following inward compression during insertion of the outer sleeve member within the support bore, are resiliently expanded outwardly to positions in which the prong extremities are in engagement with the opposite face of the support member, thereby to prevent axial displacement of the anchoring assembly relative to the support member.

2. Apparatus as defined in claim 1, wherein said stop means comprises a transverse wall adjacent the said other end of said inner sleeve member, said transverse wall containing a central bore for receiving the inner cable member.

3. Apparatus as defined in claim 2, wherein the length of said outer sleeve member is greater than that of said inner sleeve member, thereby to define a space between said other end of said outer sleeve member and said transverse wall.

4. Apparatus as defined in claim 1, wherein said inner sleeve member includes adjacent its said other end a tubular portion of reduced inner diameter having an annular shoulder that defines said internal stop means.

5. Apparatus as defined in claim 4, wherein said inner sleeve member includes at said other end a transverse wall containing a through bore for receiving the inner cable member.

6. Apparatus as defined in claim 5, and further including an annular resilient seal mounted within the tubular portion of reduced diameter of said inner sleeve member, said seal being in engagement at one end with said transverse wall and terminating at its other end adjacent said annular shoulder.

7. Apparatus as defined in claim 6, wherein the internal diameter of said annular seal corresponds with the diameter of the inner cable member.

8. Apparatus as defined in claim 4, wherein the length of said inner sleeve member is greater than that of said outer sleeve member, said portion of reduced internal diameter of said inner sleeve member being arranged externally of said outer sleeve member and being spaced from the other end of said inner sleeve member, and further wherein said inner sleeve member includes at its said other end a transverse wall containing a through bore for receiving the inner cable member.

9. Apparatus as defined in claim 8, and further including an annular resilient seal member mounted at one end concentrically about the said other end of said inner sleeve member, said seal member having at its other end a reduced portion the internal diameter of which corresponds generally with that of the cable inner member.

10. Apparatus as defined in claim 1, wherein said collar member includes at its other end an annular external flange portion.

11. Apparatus as defined in claim 10, and further including an annular resilient seal member mounted concentrically upon said collar flange portion and adapted to extend between said collar member and the adjacent face of the support member.

12. Apparatus as defined in claim 4, wherein said other end of said outer sleeve member is also reduced in internal diameter to correspond with the reduced diameter of said other end of said inner sleeve member.

13. Apparatus as defined in claim 12, wherein the said other end of said inner sleeve member is stepped to define a further portion of reduced internal diameter, said further reduced portion terminating in a transverse wall containing a through bore for receiving the inner cable member, and further including an annular resilient seal member arranged concentrically within both of said inner sleeve portions of reduced inner diameter.

* * * * *